United States Patent
Benkreira et al.

(10) Patent No.: US 10,395,249 B1
(45) Date of Patent: *Aug. 27, 2019

(54) MULTI-FACTOR AUTOMATED TELLER MACHINE (ATM) PERSONAL IDENTIFICATION NUMBER (PIN)

(71) Applicant: Capital One Services, LLC, McLean, VA (US)

(72) Inventors: Abdelkadar M'Hamed Benkreira, Washington, DC (US); Michael Mossoba, Arlington, VA (US); Joshua Edwards, Philadelphia, PA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/139,725

(22) Filed: Sep. 24, 2018

Related U.S. Application Data

(63) Continuation of application No. 15/904,034, filed on Feb. 23, 2018, now Pat. No. 10,096,026.

(51) Int. Cl.
| | |
|---|---|
| *G06K 7/00* | (2006.01) |
| *G06Q 20/40* | (2012.01) |
| *G07F 19/00* | (2006.01) |
| *G06F 21/40* | (2013.01) |

(Continued)

(52) U.S. Cl.
CPC ....... *G06Q 20/4012* (2013.01); *G06F 3/0414* (2013.01); *G06F 21/40* (2013.01); *G07F 19/201* (2013.01); *G06F 3/0488* (2013.01)

(58) Field of Classification Search
USPC .......... 235/375–385; 705/5, 35–45
See application file for complete search history.

(56) References Cited

U.S. PATENT DOCUMENTS

| | | | | |
|---|---|---|---|---|
| 6,062,474 A | | 5/2000 | Kroll | |
| 10,096,026 B1 * | | 10/2018 | Benkreira | ........... G06F 3/04883 |

(Continued)

FOREIGN PATENT DOCUMENTS

| | | | | |
|---|---|---|---|---|
| EP | 3002700 A1 * | 4/2016 | ........... G06F 3/0236 |
| EP | 3002700 B1 | 12/2017 | |

OTHER PUBLICATIONS

Extended European Search Report for Application No. EP19157712.1, dated Jun. 28, 2019, 8 pages.

*Primary Examiner* — Matthew Mikels
(74) *Attorney, Agent, or Firm* — Harrity & Harrity, LLP

(57) ABSTRACT

An automated teller machine (ATM) may include an input component and one or more processors. The input component may be configured to detect multi-factor input associated with an account. The multi-factor input may include at least two of: a sequence of characters input via the input component, a force with which at least one character, of the sequence of characters, is input via the input component, a length of time over which at least one character, of the sequence of characters, is input via the input component, or a combination of at least two characters, of the sequence of characters, that are input concurrently via the input component. The ATM may receive the multi-factor input, validate the multi-factor input in association with the account, and selectively permit or deny access to one or more actions associated with the account based on validating the multi-factor input.

20 Claims, 7 Drawing Sheets

(51) Int. Cl.
  *G06F 3/041* (2006.01)
  *G06F 3/0488* (2013.01)

(56) References Cited

U.S. PATENT DOCUMENTS

2016/0093131 A1  3/2016  Schuette
2016/0155106 A1  6/2016  Streuter et al.

* cited by examiner

MULTI-FACTOR AUTOMATED TELLER MACHINE (ATM) PERSONAL IDENTIFICATION NUMBER (PIN)

RELATED APPLICATION

This application is a continuation of U.S. patent application Ser. No. 15/904,034, filed Feb. 23, 2018 (now U.S. Pat. No. 10,096,026), which is incorporated herein by reference.

BACKGROUND

An automated teller machine (ATM) may refer to an electronic telecommunications device that enables customers of financial institutions to perform financial transactions, such as cash withdrawals, deposits, transfer of funds, or obtaining account information, at any time and without the need for direct interaction with bank staff. ATMs are known by a variety of names, including an automatic teller machine, an automated banking machine (ABM), a cash point, a Cashline®, a Minibank®, a cash machine, a Tyme® machine, a cash dispenser, a Bankomat®, or a Bancomat®.

SUMMARY

In some implementations, an automated teller machine (ATM) may include an input component and one or more processors. The input component may be configured to detect multi-factor input associated with an account. The multi-factor input may include at least two of: a sequence of characters input via the input component, a force with which at least one character, of the sequence of characters, is input via the input component, a length of time over which at least one character, of the sequence of characters, is input via the input component, or a combination of at least two characters, of the sequence of characters, that are input concurrently via the input component. The one or more processors may be configured to receive the multi-factor input, validate the multi-factor input in association with the account, and selectively permit or deny access to one or more actions associated with the account based on validating the multi-factor input.

In some implementations, a method may include receiving, by an automated teller machine (ATM), multi-factor input associated with validating access to an account. The multi-factor input may include at least two of: a sequence of characters, a level of force with which at least one character, of the sequence of characters, is input, a length of time over which at least one character, of the sequence of characters, is input, or a combination of at least two characters, of the sequence of characters, that are input concurrently. The method may include determining, by the ATM, whether the multi-factor input is valid for the account. The method may include selectively permitting or denying, by the ATM, performance of one or more actions associated with the account based on determining whether the multi-factor input is valid for the account.

In some implementations, a device may include one or more memories and one or more processors communicatively coupled to the one or more memories. The one or more processors may be configured to: receive input associated with access validation. The input may include at least two of: a sequence of characters, a level of force with which at least one character, of the sequence of characters, is input, a length of time over which at least one character, of the sequence of characters, is input, or a combination of at least two characters, of the sequence of characters, that are input concurrently. The one or more processors may be configured to determine whether the input is valid, and selectively permit or deny access based on determining whether the input is valid.

Implementations generally include a method, apparatus, system, computer program product, non-transitory computer-readable medium, ATM, validation device, and user device as substantially described herein with reference to and as illustrated by the accompanying drawings and specification.

DETAILED DESCRIPTION

The following detailed description of example implementations refers to the accompanying drawings. The same reference numbers in different drawings may identify the same or similar elements.

A personal identification number (PIN) or other input, used to access an account or other secure information, may be stolen and used for malicious purposes (e.g., to steal money, commit fraud, and/or the like). In some cases, a malicious person may steal a PIN by watching an ATM user input the PIN, by installing a camera that records an ATM user inputting the PIN, by analyzing a PIN pad to determine input numbers, and/or the like. Because PINs typically consist of a sequence of numbers (e.g., 4 numbers and/or the like), a malicious person needs to know only the numbers and the sequence in order to obtain fraudulent access to an account. Some techniques and apparatuses described herein add other factors to a PIN, such as a force with which a number is pressed, a length of time that a number is pressed, a combination of numbers pressed at the same time, and/or the like. In this way, techniques and apparatuses described herein increase the security of accounts and/or other secure information and reduce fraud.

Figure 1A:
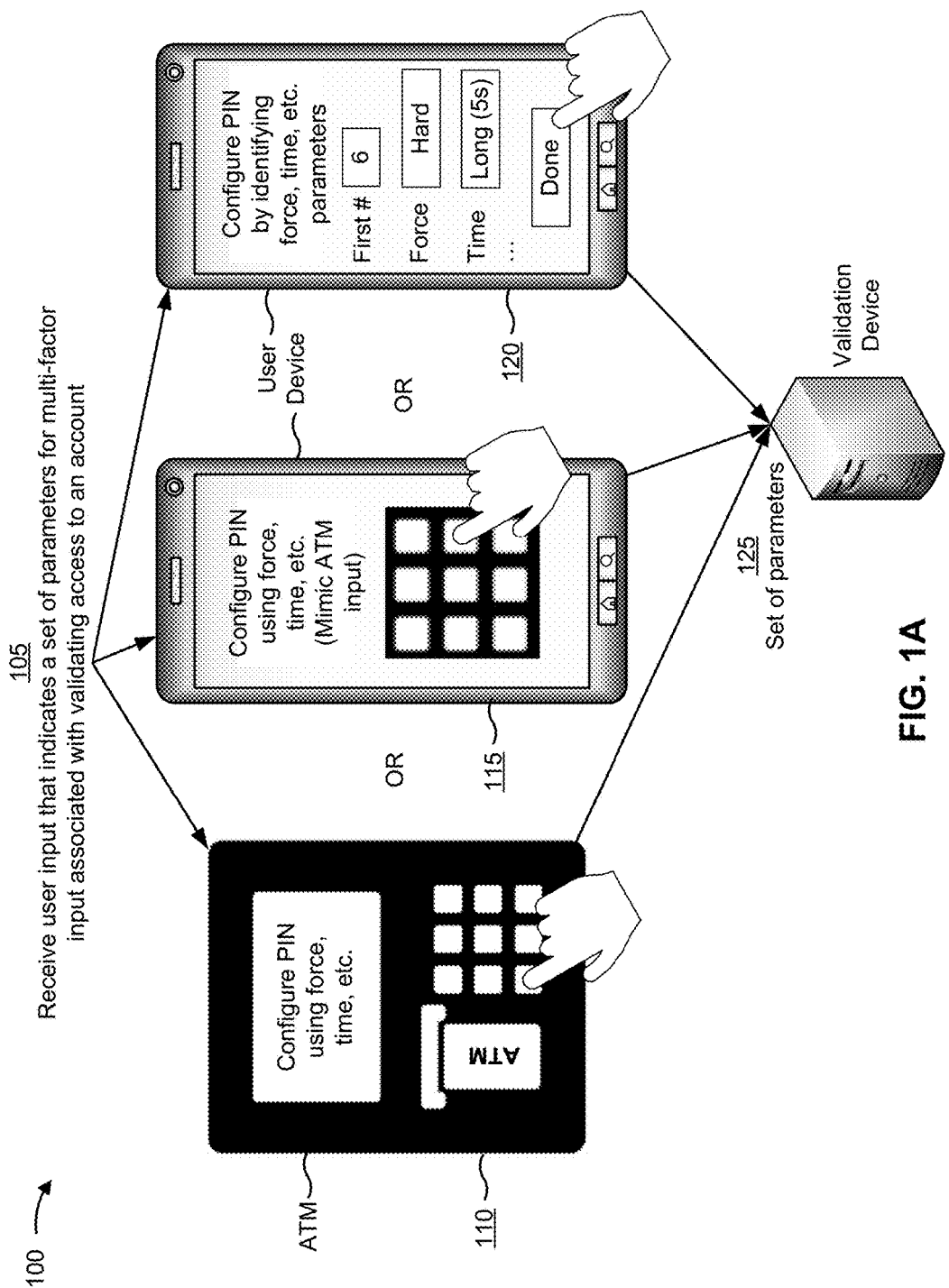
FIGS. 1A and 1B are diagrams of an example implementation described herein.
Figure 1B:
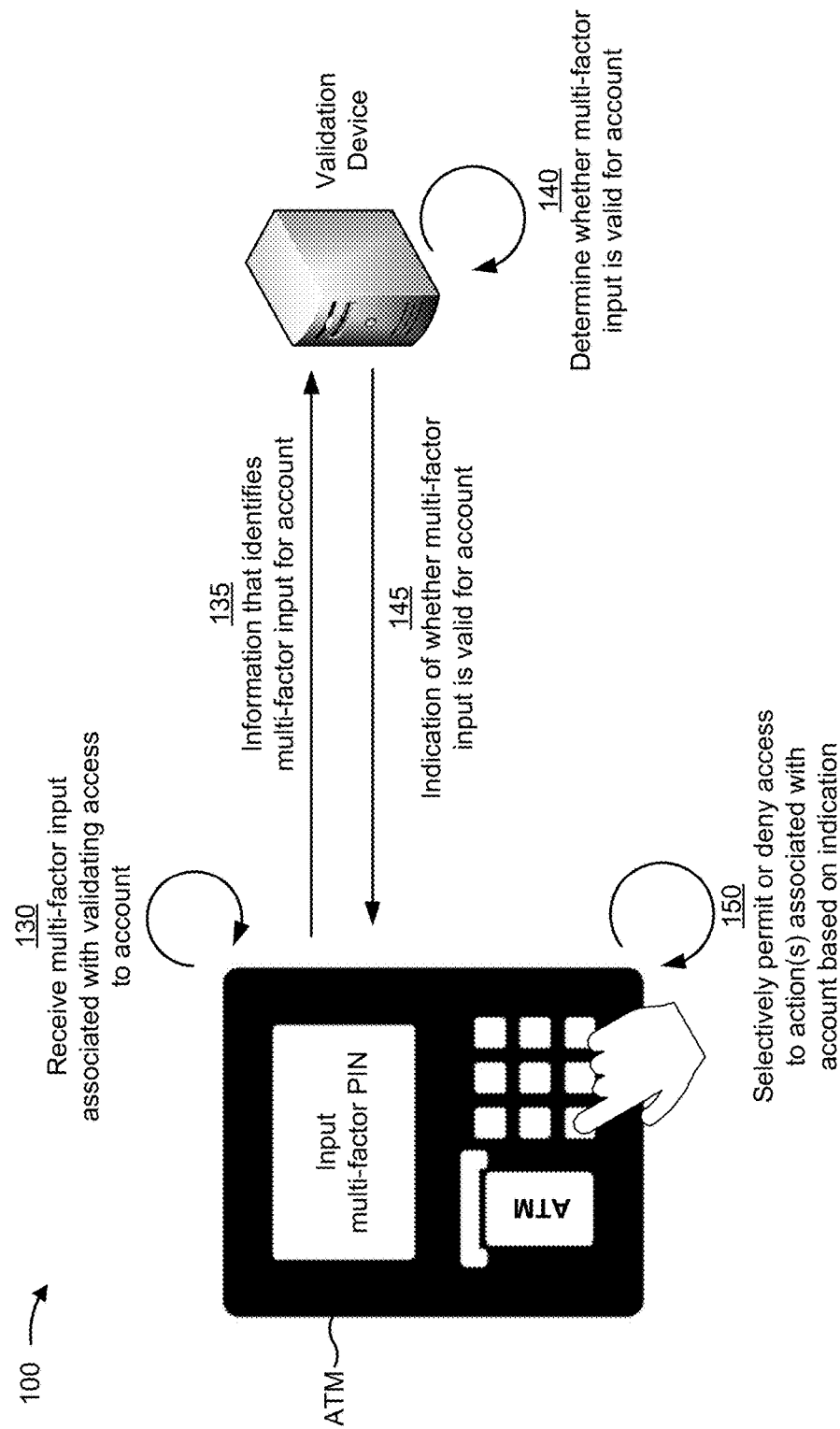

FIGS. 1A and 1B are diagrams of an example implementation 100 described herein. As shown in FIG. 1A, a user may interact with an ATM or a user device (e.g., a smart phone, a tablet, and/or the like) to configure a multi-factor input, such as a multi-factor PIN. For example, as shown by reference number 105, a device (e.g., an ATM, a user device, and/or the like) may receive user input that indicates a set of parameters for multi-factor input associated with validating access to an account. The set of parameters may include, for example, a sequence of characters to be used as the multi-factor input, a force with which at least one character is to be input for the multi-factor input, a length of time over which at least one character is to be input for the multi-factor input, a combination of at least two characters that are to be input concurrently for the multi-factor input, and/or the like. In some implementations, the set of parameters may include multiple of these and/or other parameters.

In some implementations, as shown by reference number 110, the device may be an ATM, and the user may input the set of parameters by interacting with an input component of the ATM (e.g., one or more mechanical buttons, one or more electronic buttons, one or more sensors, a keypad, a number pad, a touch screen, and/or the like). In this case, the user may receive a temporary PIN (e.g., in the mail, electronically, and/or the like) that corresponds to a transaction card (e.g., a debit card and/or the like). The user may interact with the ATM using the transaction card (e.g., by inserting the transaction card and/or the like), may input the temporary PIN, and may be prompted to create a new multi-factor PIN. The user may interact with the input component of the ATM to create the multi-factor PIN, such as by inputting a sequence of characters (e.g., numbers, letters, symbols, or other characters), inputting one or more characters using a particular amount of force, inputting one or more characters for a particular length of time, inputting two or more characters concurrently, and/or the like. In some implementations, the user may provide input to indicate that the user has finished inputting the multi-factor PIN. In some implementations, the user may be prompted to repeat the input a particular quantity of times (e.g., repeat once, repeat twice, and/or the like) to confirm the multi-factor PIN.

In some implementations, as shown by reference number 115, the device may be a user device (e.g., not an ATM), and the user may input the set of parameters by interacting with an input component of the user device (e.g., one or more mechanical buttons, one or more electronic buttons, one or more sensors, a keypad, a number pad, a touch screen, and/or the like). In some implementations, the user may interact with the input component of the user device to create the multi-factor PIN, in a similar manner as described above in connection with the ATM. For example, the user may interact with the user device to mimic ATM input.

In some implementations, as shown by reference number 120, the user may input the set of parameters by identifying values for the set of parameters. For example, the user may indicate a first sequential character (e.g., a number) in a sequence of characters of the multi-factor input, may input a value that indicates a force for the first sequential character (e.g., soft, medium, hard, and/or the like), may input a length of time that the first sequential character is to be input (e.g., short, medium, long, 1 second, 2 seconds, 3 seconds, and/or the like), may indicate whether the first sequential character should include a single character or multiple characters input concurrently, and/or the like.

As shown by reference number 125, the device (e.g., the ATM, the user device, and/or the like) may transmit the set of parameters to a validation device (e.g., a server and/or the like). The validation device may be associated with validating access to an account, and may be stored (e.g., securely, in an encrypted manner, and/or the like) to permit the validation device to validate a subsequent attempt to access the account via an ATM, as described below in connection with FIG. 1B. While some implementations are described herein in connection with validating access to a financial account, the multi-factor input may be used for other types of access validation, such as access to a non-financial account, access to secure information, access to a secure area, and/or the like. In some implementations, the multi-factor input may be input to a device other than an ATM, such as a computing device, an access device that permits or denies access to secure information or a secure area, and/or the like.

As shown in FIG. 1B and by reference number 130, at a later time, an ATM may receive multi-factor input associated with validating access to an account. As shown, in some implementations, the ATM may include an output component (e.g., a display and/or the like) that outputs an indication that the ATM accepts multi-factor input. As described above, the multi-factor input may include a sequence of characters, such as a sequence of numbers, letters, symbols, and/or the like. For example, a user may interact with an input component of the ATM to input a sequence of characters for validating access to an account (e.g., after inputting a transaction card associated with the account). Additionally, or alternatively, the multi-factor input may include a level of force with which at least one character, of the sequence of characters, is input. For example, the user may interact with an input component of the ATM to input (e.g., touch, press, select, and/or the like) a character with a particular level of force (e.g., within a range of force levels). In some implementations, different characters may be input with different levels of force. In some implementations, different characters may be input with the same level of force. In some implementations, each character, included in the sequence of characters, may be associated with a corresponding level of force with which that character is input. In some implementations, the level of force for one character, included in the sequence of characters, is independent of the level of force for another character included in the sequence of characters. In this way, security may be increased by increasing the possible combinations of factors that can be input to obtain access to an account.

Additionally, or alternatively, the multi-factor input may include a length of time over which at least one character, of the sequence of characters, is input. For example, the user may interact with an input component of the ATM to input a character for a particular amount of time (e.g., within a range of times). In some implementations, different characters may be input for different amounts of time. In some implementations, different characters may be input for the same amount of time. In some implementations, each character, included in the sequence of characters, may be associated with a corresponding length of time with which that character is input. In some implementations, the length of time for one character, included in the sequence of characters, is independent of the length of time for another character included in the sequence of characters. In this way, security may be increased by increasing the possible combinations of factors that can be input to obtain access to an account.

Additionally, or alternatively, the multi-factor input may include a combination of at least two characters, of the sequence of characters, that are input concurrently. For example, the user may interact with an input component of the ATM to press two or more characters at the same time, to release two or more characters at the same time, to press and release two or more characters at the same time, to press two or more characters during an overlapping time period, and/or the like. In this way, security may be increased by increasing the possible combinations of factors that can be input to obtain access to an account.

In some implementations, the multi-factor input includes multiple factors described above and/or other factors. For example, the multi-factor input may include inputting a sequence of characters, inputting one or more characters using a particular amount of force, inputting one or more characters for a particular length of time, inputting two or more characters concurrently, and/or the like.

In some implementations, the ATM may determine whether the multi-factor input is valid for the account, such as by transmitting and/or receiving information from a validation device associated with validating access to the account. For example, as shown by reference number 135, the ATM may transmit, to the validation device, information that identifies the multi-factor input for the account (e.g., the multi-factor input that was input by the user, as described above in connection with reference number 130), such as by transmitting a set of parameters corresponding to the multi-factor input, in a similar manner as described above in connection with FIG. 1A. The information may indicate, for example, a sequence of characters received by the ATM, a level of force with which different characters were input, a length of time over which different characters were input, two or more characters that were input concurrently, a length of time over which the concurrent input was received, and/or the like. In some implementations, the ATM may indicate the level of force using a unit of measurement for force (e.g., Newtons, pounds per square inch (psi), atmospheres, and/or the like) or a mapping of the unit of measurement to a value indicative of a range of forces (e.g., hard, medium, soft, and/or the like). Similarly, the ATM may indicate the length of time using a unit of measurement for time (e.g., seconds, milliseconds, and/or the like) or a mapping of the unit of measurement to a value indicative of a range of times (e.g., long, medium, short, and/or the like).

As shown by reference number 140, the validation device may determine whether the multi-factor input is valid for the account (e.g., an account associated with a transaction card used to interact with the ATM and that corresponds to the multi-factor input). For example, the validation device may store information that identifies multi-factor input that is valid for an account (e.g., as described above in connection with FIG. 1A). The validation device may compare the stored information and the received information (e.g., by performing a lookup) to determine whether the multi-factor input being used to attempt access to the account is valid. For example, if a received set of parameters corresponding to the multi-factor input matches a stored set of parameters for the account (and/or is within a tolerance level, such as a force tolerance, a time tolerance, and/or the like, which may be configurable by a user), then the validation device may determine that the multi-factor input is valid for the account. Otherwise, the validation device may determine that the multi-factor input is invalid for the account.

As shown by reference number 145, the validation device may transmit, to the ATM, an indication of whether the multi-factor input is valid for the account based on the determination described above. As shown by reference number 150, the ATM may selectively permit or deny performance of one or more actions associated with the account based on the indication. For example, the ATM may use the indication to determine whether to permit or deny performance of one or more actions associated with the account. The one or more actions may include, for example, outputting account information associated with the account (e.g., an account number, an account balance, and/or the like), performing a transaction associated with the account, withdrawing money from the account, or depositing money to the account.

By using multi-factor input to validate account access, the ATM and/or the validation device may increase the security of an account (and/or other secure information), may reduce fraud, and/or the like.

As indicated above, FIGS. 1A and 1B are provided as an example. Other examples are possible and may differ from what was described with regard to FIGS. 1A and 1B.

Figure 2:
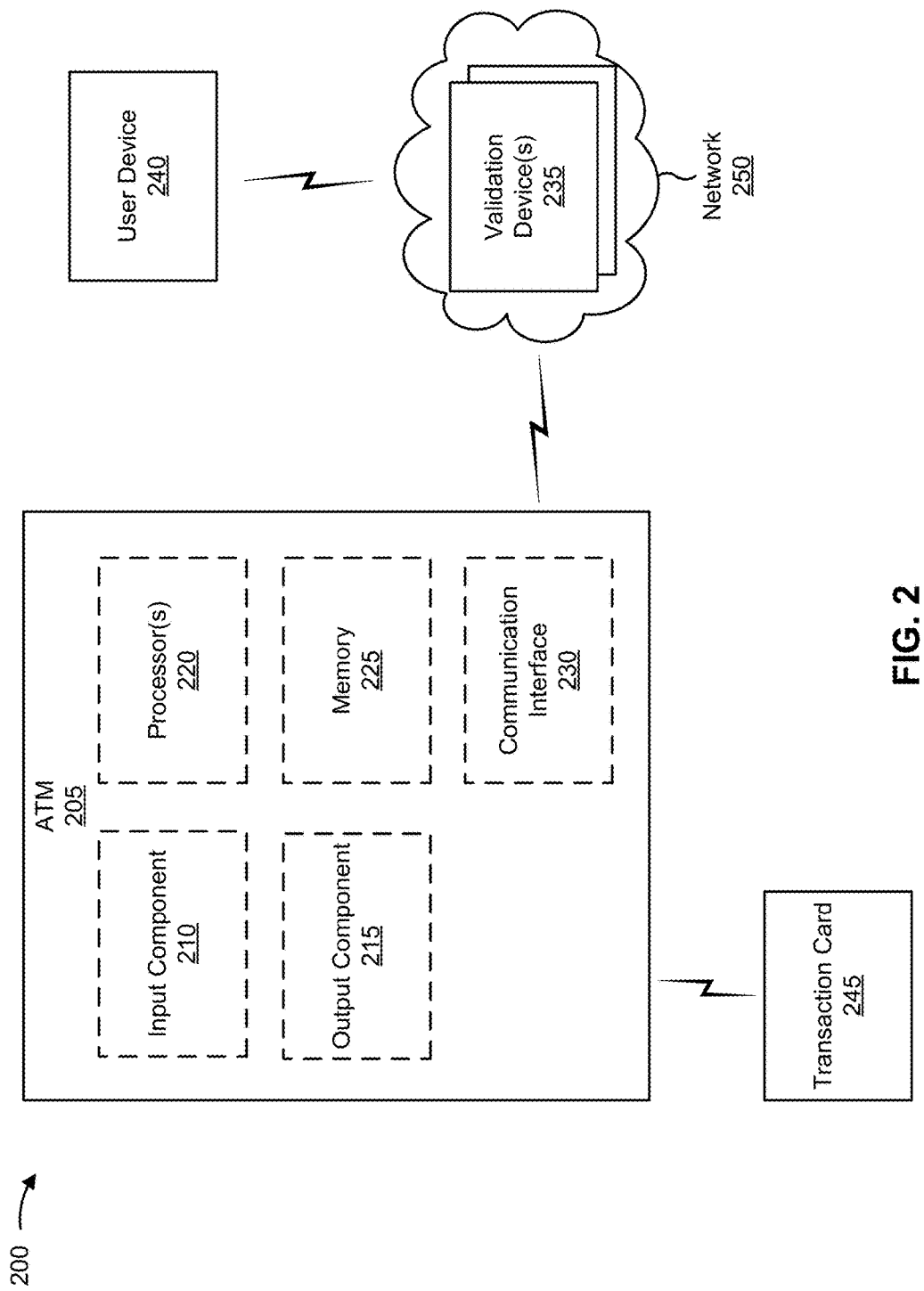
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an ATM 205, which may include an input component 210, an output component 215, one or more processors 220, one or more memories 225, and/or a communication interface 230. As further shown, environment 200 may include one or more validation devices 235, a user device 240, a transaction card 245, and/or a network 250. Devices and/or components of environment 200 may interconnect via wired connections, wireless connections, or a combination of wired and wireless connections.

ATM 205 includes one or more devices capable of performing various types of financial transactions, such as a cash withdrawal, a money deposit (e.g., a check or cash deposit), a money transfer (e.g., a transfer from one bank account to another bank account), access to information related to an account (e.g., a bank account, a checking account, a credit account, etc.), and/or the like. For example, ATM device 220 may include an ATM, an automated banking machine (ABM), a cash point, a Cashline®, a Minibank®, a cash machine, a Tyme® machine, a cash dispenser, a Bankomat®, a Bancomat®, and/or a similar type of device. In some implementations, ATM 205 may receive multi-factor input, and may determine whether to provide access to an account (e.g., to perform one or more actions associated with the account) based on the multi-factor input, as described elsewhere herein. While an ATM 205 is used as an example, the techniques described herein may be performed to permit or deny access using another type of device, such as a computer, a security door, a turnstile, and/or the like.

Input component 210 includes one or more devices capable of being used to provide multi-factor input to ATM 205. For example, input component 210 may include one or more mechanical buttons, one or more electronic buttons, one or more sensors, a keypad (e.g., a mechanical keypad, an electronic keypad, and/or the like), a number pad (e.g., a mechanical number pad, an electronic number pad, and/or the like), a PIN pad (e.g., a mechanical PIN pad, an electronic PIN pad, and/or the like), a touch screen, and/or the like. In some implementations, input component 210 may include one or more mechanical buttons and one or more sensors to detect a mechanical force with which the one or more mechanical buttons are pressed. In some implementations, input component 210 may include one or more electronic buttons and one or more sensors to detect a surface area covered when the one or more electronic buttons are pressed. In this case, a larger surface area may indicate that the electronic button is being pushed with more force, a smaller surface area may indicate that the electronic button is being pushed with less force, and/or the like. Additionally, or alternatively, input component 210 may include one or more mechanical or electronic buttons and one or more sensors to determine an amount of time that a mechanical or electronic button, of the one or more mechanical or electronic buttons, is pressed.

Output component 215 includes one or more devices capable of being used to output information from ATM 205. For example, output component 215 may include a display, a speaker, an indicator light (e.g., a light-emitting diode and/or the like), a vibrating component, and/or the like. In some implementations, output component 215 may output an indication that ATM 205 accepts multi-factor input. Additionally, or alternatively, output component 215 may output an indication of whether the multi-factor input is valid or invalid. Additionally, or alternatively, output component 215 may output information associated with an action to be performed in connection with an account.

Processor 220 includes one or more types of processing components capable of being programmed to perform a function, such as one or more operations described elsewhere herein. For example, processor 220 may perform process 400 of FIG. 4, process 500 of FIG. 5, process 600 of FIG. 6, and/or the like. In some implementations, processor 220 may correspond to processor 320, described in more detail below in connection with FIG. 3.

Memory 225 includes one or more types of memories capable of storing information. In some implementations, memory 225 may store information (e.g., a set of parameters corresponding to multi-factor input and/or the like) associated with performing one or more operations described elsewhere herein. For example, memory 225 may store information to be used (e.g., by processor 220) to perform process 400 of FIG. 4, process 500 of FIG. 5, process 600 of FIG. 6, and/or the like. In some implementations, memory 225 may correspond to memory 330, described in more detail below in connection with FIG. 3.

Communication interface 230 includes one or more types of communication interfaces that allow ATM 205 to communicate with other devices (e.g., validation device 235, user devices 240, transaction card 245, and/or the like), such as via a wired connection, a wireless connection, or a combination of wired and wireless connections. For example, communication interface 230 may be used to read information from transaction card 245, to transmit information to or receive information from validation device 235 (e.g., information associated with multi-factor input), and/or the like. In some implementations, communication interface 230 may correspond to communication interface 370, described in more detail below in connection with FIG. 3.

Validation device 235 includes one or more devices capable of validating multi-factor input. For example, validation device 235 may include a server, a cloud computing device, a transaction backend, or another type of computing device. In some implementations, validation device 235 may store a set of parameters associated with multi-factor input (e.g., for an account, for access, etc.), which may be configured and/or stored by communicating with ATM 205, user device 240, and/or the like. Additionally, or alternatively, validation device 235 may receive a set of parameters associated with multi-factor input, may compare the received parameter(s) to stored parameter(s), and may determine whether to permit or deny access based on the comparison. In some implementations, validation device 235 may transmit (e.g., to ATM 205) an indication of whether to permit or deny access based on the determination.

User device 240 includes one or more devices capable of receiving a set of parameters for configuring multi-factor input, as described elsewhere herein. For example, user device 240 may include a smart phone, a tablet computer, a laptop computer, a desktop computer, a wearable device, and/or the like.

Transaction card 245 includes a transaction card that can be used to complete a transaction and/or access account information. For example, transaction card 245 may include a credit card, a debit card, an ATM card, a stored-value card, a fleet card, a transit card, an access card, a virtual card implemented on user device 240, and/or the like. Transaction card 245 may be capable of storing and/or communicating data for a point-of-sale (PoS) transaction and/or an ATM transaction. For example, transaction card 245 may store and/or communicate data, including account information (e.g., an account identifier, a cardholder identifier, etc.), expiration information of transaction card 245 (e.g., information identifying an expiration month and/or year of transaction card 245), banking information (e.g., a routing number of a bank, a bank identifier, etc.), transaction information (e.g., a payment token), and/or the like. For example, to store and/or communicate the data, transaction card 245 may include a magnetic strip and/or an integrated circuit (IC) chip (e.g., a EUROPAY®, MASTERCARD®, or VISA® (EMV) chip). Additionally, or alternatively, transaction card 245 may include an antenna to communicate data associated with transaction card 245. The antenna may be a passive radio frequency (RF) antenna, an active RF antenna, and/or a battery-assisted RF antenna. In some implementations, transaction card 245 may be a smart transaction card, capable of communicating wirelessly (e.g., via Bluetooth, Bluetooth Low Energy (BLE), near-field communication (NFC), and/or the like) with ATM 205.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
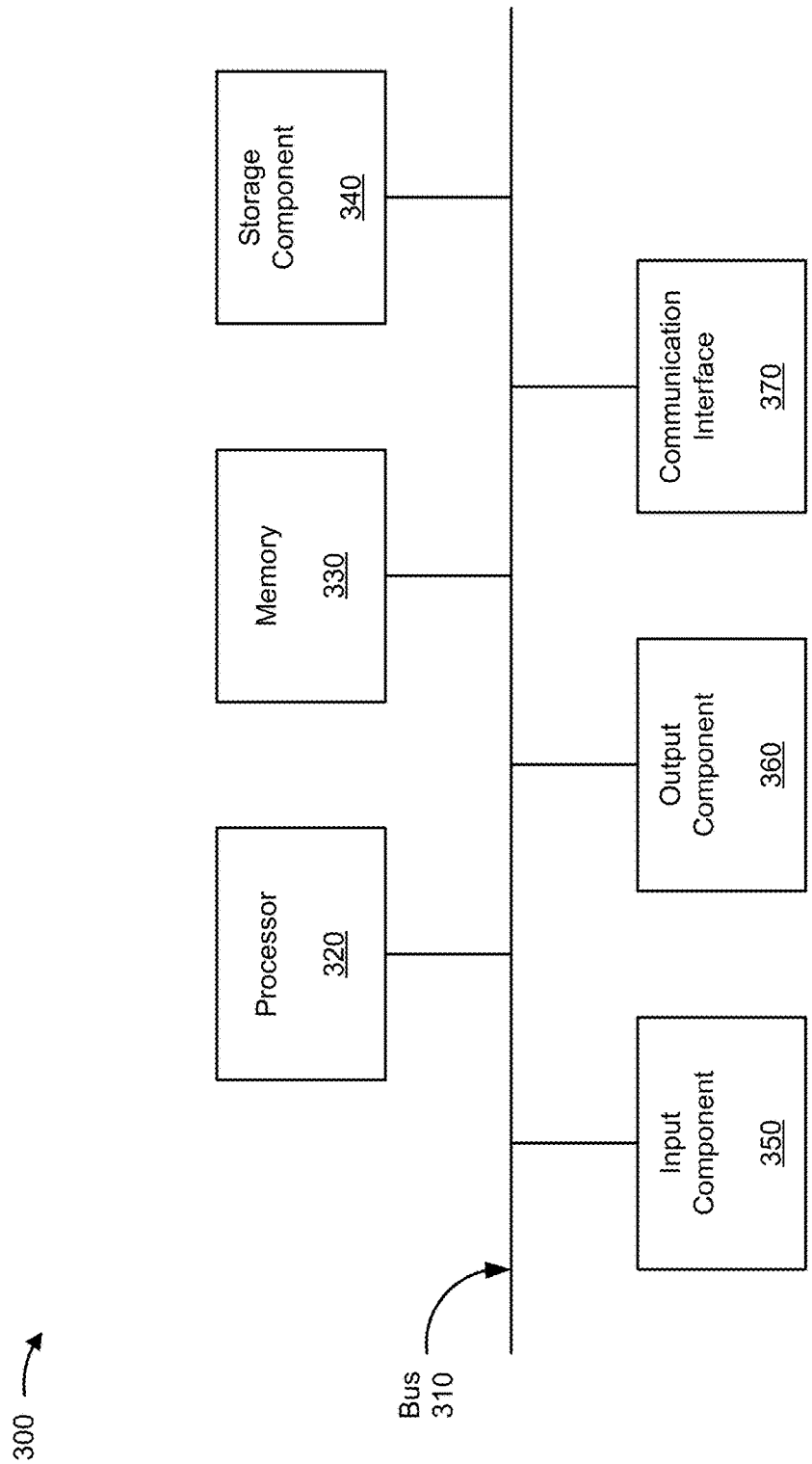
FIG. 3 is a diagram of example components of one or more devices of FIG. 2.

FIG. 3 is a diagram of example components of a device 300. Device 300 may correspond to ATM 205, validation device 235, user device 240, and/or transaction card 245. In some implementations, ATM 205, validation device 235, user device 240, and/or transaction card 245 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
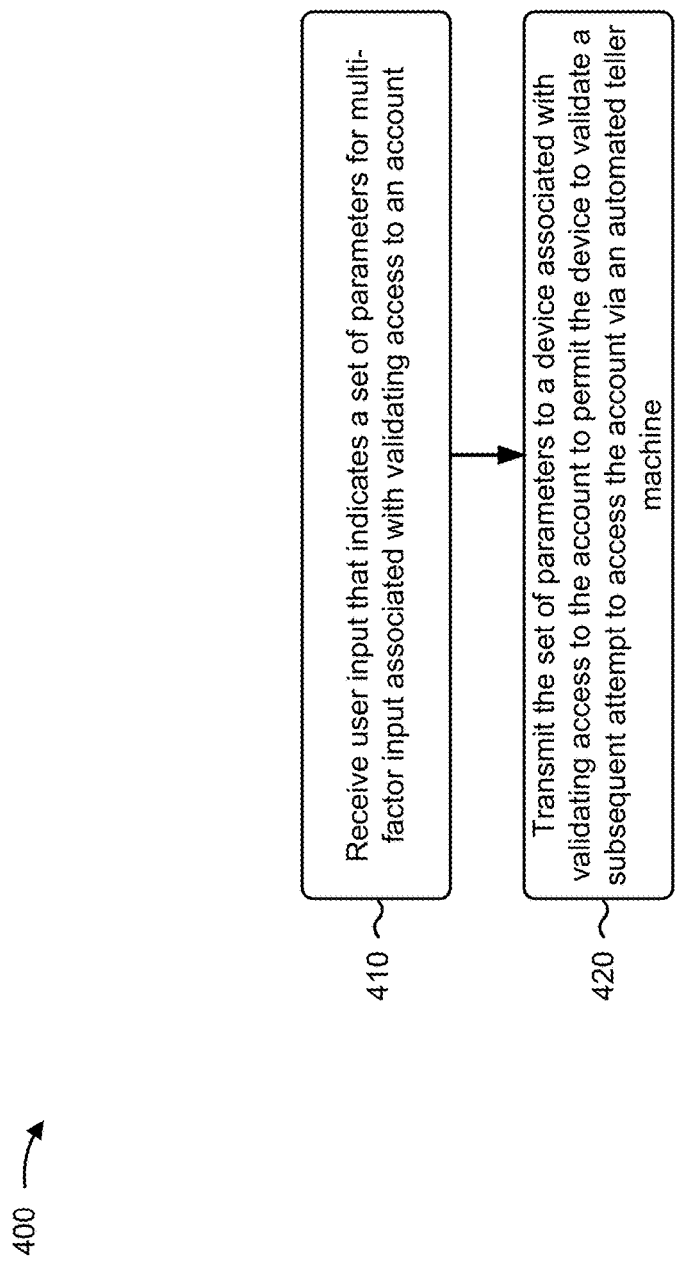
FIGS. 4-6 are flow charts of example processes relating to using a multi-factor ATM personal identification number (PIN).

FIG. 4 is a flow chart of an example process 400 for configuring multi-factor input. In some implementations, one or more process blocks of FIG. 4 may be performed by ATM 205 and/or user device 240. In some implementations, one or more process blocks of FIG. 4 may be performed by another device or a group of devices separate from or including ATM 205 and/or user device 240, such as validation device 235.

As shown in FIG. 4, process 400 may include receiving user input that indicates a set of parameters for multi-factor input associated with validating access to an account (block 410). For example, ATM 205 and/or user device 240 (e.g., using an input component and/or the like) may receive user input that indicates a set of parameters for multi-factor input associated with validating access to an account, as described above in connection with FIGS. 1A-1B. In some implementations, the set of parameters includes at least two of: a sequence of characters to be used as the multi-factor input, a force with which at least one character, of the sequence of characters, is to be input for the multi-factor input, a length of time over which at least one character, of the sequence of characters, is to be input for the multi-factor input, or a combination of at least two characters, of the sequence of characters, that are to be input concurrently for the multi-factor input.

As further shown in FIG. 4, process 400 may include transmitting the set of parameters to a device associated with validating access to the account to permit the device to validate a subsequent attempt to access the account via an automated teller machine (block 420). For example, ATM 205 and/or user device 240 (e.g., using a communication interface and/or the like) may transmit the set of parameters to a device (e.g., validation device 235) associated with validating access to the account to permit the device (e.g., validation device 235) to validate a subsequent attempt to access the account via an ATM 205, as described above in connection with FIGS. 1A-1B.

Process 400 may include additional implementations, such as any single implementation or any combination of implementations described in connection with FIG. 5 and/or FIG. 6.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
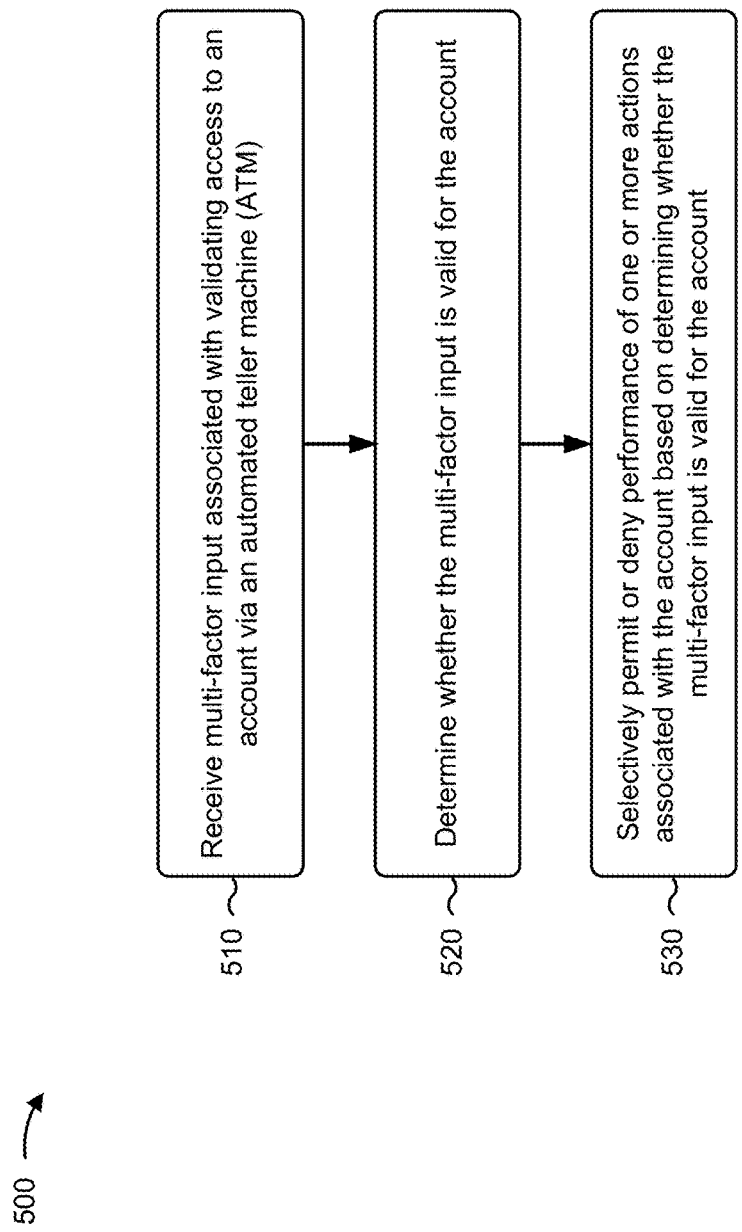

FIG. 5 is a flow chart of an example process 500 for configuring multi-factor input. In some implementations, one or more process blocks of FIG. 5 may be performed by ATM 205. In some implementations, one or more process blocks of FIG. 5 may be performed by another device or a group of devices separate from or including ATM 205, such as validation device 235, user device 240, and/or transaction card 245.

As shown in FIG. 5, process 500 may include receiving multi-factor input associated with validating access to an account via an ATM (block 510). For example, ATM 205 (e.g., using an input component and/or the like) may receive multi-factor input associated with validating access to an account, as described above in connection with FIGS. 1A-1B. In some implementations, the multi-factor input includes at least two of: a sequence of characters, a level of force with which at least one character, of the sequence of characters, is input, a length of time over which at least one character, of the sequence of characters, is input, or a combination of at least two characters, of the sequence of characters, that are input concurrently.

As further shown in FIG. 5, process 500 may include determining whether the multi-factor input is valid for the account (block 520). For example, ATM 205 (e.g., using a processor, a communication interface, and/or the like) may determine whether the multi-factor input is valid for the account, as described above in connection with FIGS. 1A-1B.

As further shown in FIG. 5, process 500 may include selectively permitting or denying performance of one or more actions associated with the account based on determining whether the multi-factor input is valid for the account (block 530). For example, ATM 205 (e.g., using a processor and/or the like) may selectively permit or deny performance of one or more actions associated with the account based on determining whether the multi-factor input is valid for the account, as described above in connection with FIGS. 1A-1B.

Process 500 may include additional implementations, such as any single implementation or any combination of implementations described below and/or described in connection with FIG. 4 and/or FIG. 6.

In some implementations, the multi-factor input includes the sequence of characters and the level of force with which at least one character, of the sequence of characters, is input. In some implementations, the multi-factor input includes the sequence of characters and the length of time over which at least one character, of the sequence of characters, is input. In some implementations, the multi-factor input includes: the sequence of characters, the level of force with which at least one character, of the sequence of characters, is input, and the length of time over which at least one character, of the sequence of characters, is input.

In some implementations, each character, included in the sequence of characters, is associated with a corresponding level of force with which that character is input. In some implementations, each character, included in the sequence of characters, is associated with a corresponding length of time over which that character is input. In some implementations, the level of force is within a range of force. In some implementations, the length of time is within a range of time. In some implementations, the one or more actions include at least one of: outputting account information associated with the account, performing a transaction associated with the account, withdrawing money from the account, or depositing money to the account.

In some implementations, ATM 205 receives the multi-factor input via an input component. In some implementations, the input component includes one or more mechanical buttons and one or more sensors to detect a mechanical force with which the one or more mechanical buttons are pressed. In some implementations, the input component includes one or more electronic buttons and one or more sensors to detect a surface area covered when the one or more electronic buttons are pressed. In some implementations, the input component includes one or more mechanical or electronic buttons and one or more sensors to determine an amount of time that a mechanical or electronic button, of the one or more mechanical or electronic buttons, is pressed. In some implementations, the input component includes a mechanical keypad or a mechanical number pad. In some implementations, the input component includes a touch screen. In some implementations, ATM 205 includes an output component configured to output an indication that the input component accepts multi-factor input.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
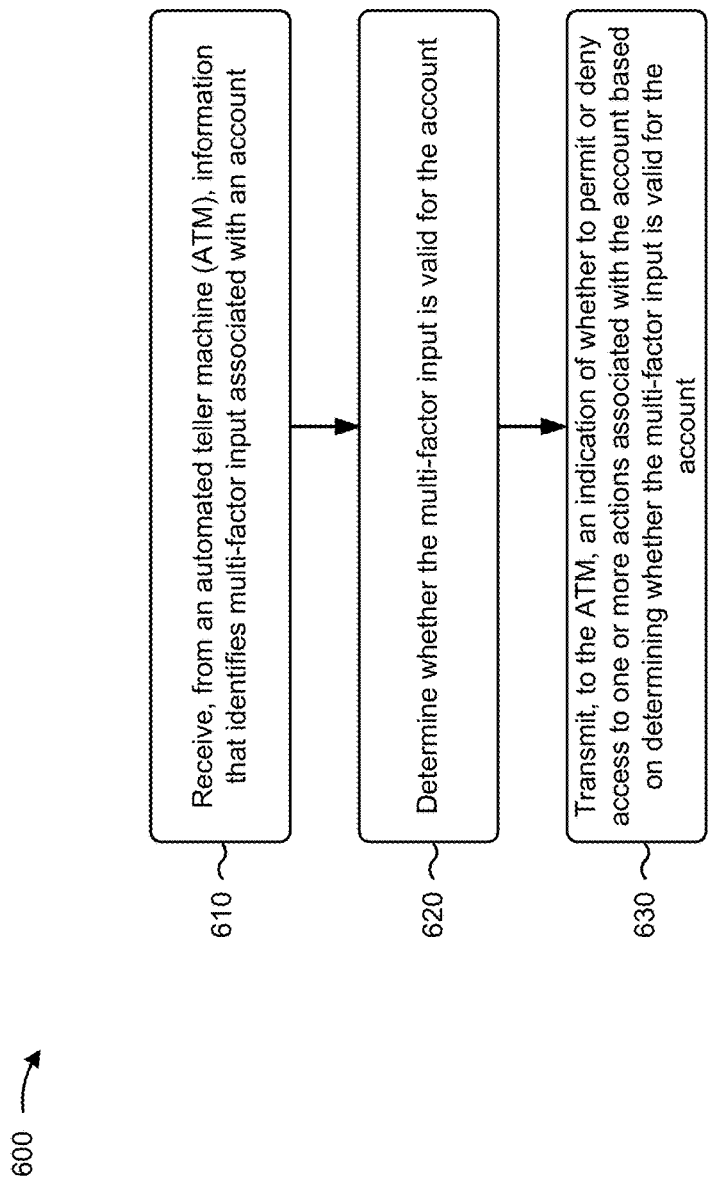

FIG. 6 is a flow chart of an example process 600 for validating multi-factor input. In some implementations, one or more process blocks of FIG. 6 may be performed by validation device 235. In some implementations, one or more process blocks of FIG. 6 may be performed by another device or a group of devices separate from or including validation device 235, such as ATM 205.

As shown in FIG. 6, process 600 may include receiving, from an ATM, information that identifies multi-factor input associated with an account (block 610). For example, validation device 235 (e.g., using a processor, a communication interface, and/or the like) may receive information that identifies multi-factor input associated with an account, as described above in connection with FIGS. 1A-1B. In some implementations, validation device 235 may receive the information from an ATM 205.

As further shown in FIG. 6, process 600 may include determining whether the multi-factor input is valid for the account (block 620). For example, validation device 235 (e.g., using a memory, a processor, and/or the like) may determine whether the multi-factor input is valid for the account, as described above in connection with FIGS. 1A-1B.

As further shown in FIG. 6, process 600 may include transmitting, to the ATM, an indication of whether to permit or deny access to one or more actions associated with the account based on determining whether the multi-factor input is valid for the account (block 630). For example, validation device 235 (e.g., using a processor, a communication interface, and/or the like) may transmit an indication of whether to permit or deny access to one or more actions associated with the account based on determining whether the multi-factor input is valid for the account, as described above in connection with FIGS. 1A-1B. In some implementations, validation device 235 may transmit the indication to an ATM 205 from which the information that identifies the multi-factor input was received.

Process 600 may include additional implementations, such as any single implementation or any combination of implementations described in connection with FIG. 4 and/or FIG. 5.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

By using a multi-factor input, such as a multi-factor PIN, techniques and apparatuses described herein may increase the security of accounts and/or other secure information, may reduce fraud, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An automated teller machine (ATM), comprising:
    an input component configured to detect multi-factor input associated with an account,
    the multi-factor input comprising a combination of at least two characters, of a sequence of characters, that are input concurrently via the input component and at least one of:
        the sequence of characters input via the input component,
        a force with which at least one character, of the sequence of characters, is input via the input component, or
        a length of time over which at least one character, of the sequence of characters, is input via the input component; and
    one or more processors configured to:
        provide a user interface to create the multi-factor input associated with the account,
        the user interface allowing a user to identify values for the multi-factor input; and
        create the multi-factor input based upon input from the user.

2. The ATM of claim 1, where the user receives a temporary personal identification number (PIN) associated with the account,
    the temporary PIN being input prior to creating the multi-factor input.

3. The ATM of claim 1, where the one or more processors are further to:
    receive the multi-factor input;
    validate the multi-factor input in association with the account; and
    selectively permit or deny access to one or more actions associated with the account based on validating the multi-factor input.

4. The ATM of claim 1, where the user provides additional input to indicate that the user has finished creating the multi-factor input.

5. The ATM of claim 1, further comprising:
    an output component configured to output an indication that the input component accepts the multi-factor input.

6. The ATM of claim 1, where the input component includes one or more mechanical or electronic buttons and one or more sensors to determine an amount of time that a mechanical or electronic button, of the one or more mechanical or electronic buttons, is pressed.

7. The ATM of claim 1, where the input component includes one or more electronic buttons and one or more sensors to detect a surface area covered when the one or more electronic buttons are pressed.

8. A method, comprising:
    receiving, by a device, a temporary personal identification number (PIN) associated with an account,
        the temporary PIN being received based upon a user interacting with an input component of an automated teller machine (ATM);
    providing, by the device, a user interface for creating a multi-factor input associated with validating access to the account,
        the multi-factor input comprising a combination of at least two characters, of a sequence of characters, that are input concurrently via the input component and at least one of:
            the sequence of characters input via the input component,
            a force with which at least one character, of the sequence of characters, is input via the input component, or
            a length of time over which at least one character, of the sequence of characters, is input via the input component; and
    creating, by the device, the multi-factor input based upon input from the user.

9. The method of claim 8, further comprising:
    receiving the multi-factor input associated with validating access to the account,
    determining whether the multi-factor input is valid for the account; and
    selectively permitting or denying performance of one or more actions associated with the account based on determining whether the multi-factor input is valid for the account.

10. The method of claim 9, where the one or more actions include at least one of:
    outputting account information associated with the account,
    performing a transaction associated with the account, withdrawing money from the account, or depositing money to the account.

11. The method of claim 8, where the user provides additional input to indicate that the user has finished creating the multi-factor input.

12. The method of claim 8, where the multi-factor input includes:

the sequence of characters, the force with which the at least one character, of the sequence of characters, is input, and the length of time over which the at least one character, of the sequence of characters, is input.

13. The method of claim 8, where each character, included in the sequence of characters, is associated with a corresponding level of force with which that character is input.

14. The method of claim 8, where each character, included in the sequence of characters, is associated with a corresponding length of time over which that character is input.

15. A user device, comprising:

one or more memories; and one or more processors, communicatively coupled to the one or more memories, configured to:

receive a temporary personal identification number (PIN) associated with an account, the temporary PIN being received based upon a user interacting with an input component of an automated teller machine (ATM);

provide a user interface for creating input associated with access validation of the account, the input comprising a combination of at least two characters, of a sequence of characters, that are input concurrently via the input component and at least one of:

the sequence of characters, a level of force with which at least one character, of the sequence of characters, is input, or a length of time over which at least one character, of the sequence of characters, is input, the user interface allowing the user to identify values for the input; and create the input based upon the user identifying values for the input.

16. The user device of claim 15, where the one or more processors are further to:

receive the input associated with the access validation;

determine whether the input is valid; and selectively permit or deny access based on determining whether the input is valid.

17. The user device of claim 15, where the input includes:

the sequence of characters, the level of force with which the at least one character, of the sequence of characters, is input, and the length of time over which the at least one character, of the sequence of characters, is input.

18. The user device of claim 15, where the one or more processors, when selectively permitting or denying access, are configured to:

selectively permit or deny access to one or more actions associated with the account, wherein the one or more actions include at least one of:

outputting account information associated with the account, performing a transaction associated with the account, withdrawing money from the account, or depositing money to the account.

19. The user device of claim 15, where the input includes the sequence of characters and the level of force with which the at least one character, of the sequence of characters, is input.

20. The user device of claim 15, where the input includes the sequence of characters and the length of time over which the at least one character, of the sequence of characters, is input.

\* \* \* \* \*